United States Patent [19]

Mills

[11] Patent Number: 4,907,545

[45] Date of Patent: Mar. 13, 1990

[54] LIQUID COOLED PISTON RING CARRIER ASSEMBLY AND PISTON USING SAME

[75] Inventor: Floyd D. Mills, King Ferry, N.Y.

[73] Assignee: Caterpillar Inc., Peoria, Ill.

[21] Appl. No.: 291,091

[22] Filed: Dec. 28, 1988

[51] Int. Cl.$^4$ ............................................... F01P 1/04
[52] U.S. Cl. ............................ 123/41.35; 123/193 P;
  92/186; 277/168
[58] Field of Search ............... 123/41.35, 41.36, 193 P,
  123/254; 92/186; 277/168, 169, 170, 171, 172

[56] References Cited

U.S. PATENT DOCUMENTS

| | | | |
|---|---|---|---|
| 4,083,292 | 4/1978 | Goloff | 92/186 |
| 4,408,575 | 10/1983 | Clairmont, Jr. et al. | 123/41.35 |
| 4,651,631 | 3/1987 | Avezon | 123/193 P |

FOREIGN PATENT DOCUMENTS

| | | | |
|---|---|---|---|
| 695709 | 8/1940 | Fed. Rep. of Germany | 123/41.35 |
| 1097210 | 1/1961 | Fed. Rep. of Germany | |
| 1244722 | 9/1960 | France | 123/41.35 |
| 2044242 | 2/1971 | France | |

Primary Examiner—Noah P. Kamen
Attorney, Agent, or Firm—Kenneth A. Rhoads

[57] ABSTRACT

This invention relates to a liquid-cooled piston ring carrier assembly and piston for internal combustion engines. The ring carrier assembly includes an annular metallic body and an enclosure member collectively defining an integral coolant channel. During engine operation, liquid coolant is directed to the coolant channel by way of an inlet passage in the skirt portion of the piston and an aligned inlet port in the ring carrier assembly. An outlet passage in the skirt portion of the piston and an aligned outlet port conveys coolant away from the coolant channel.

9 Claims, 3 Drawing Sheets

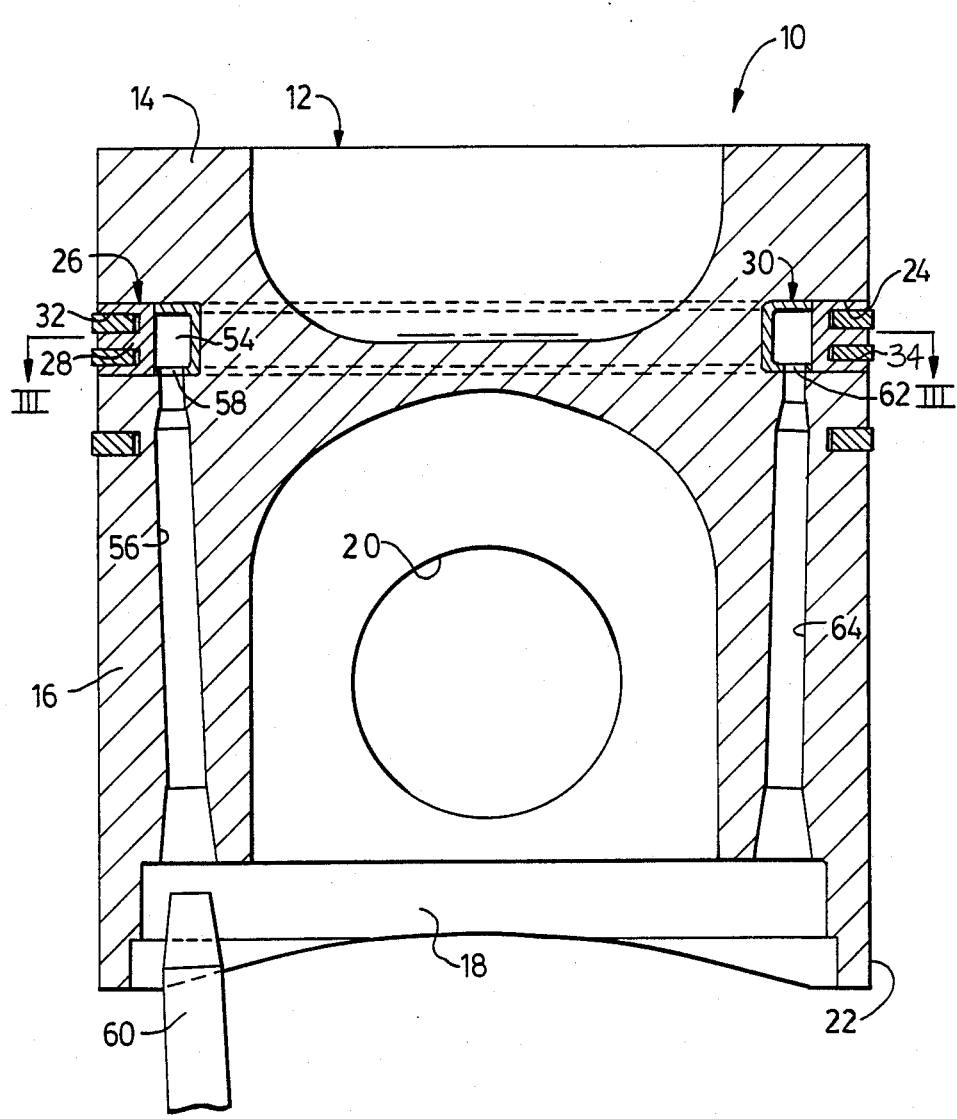
Fig_1_

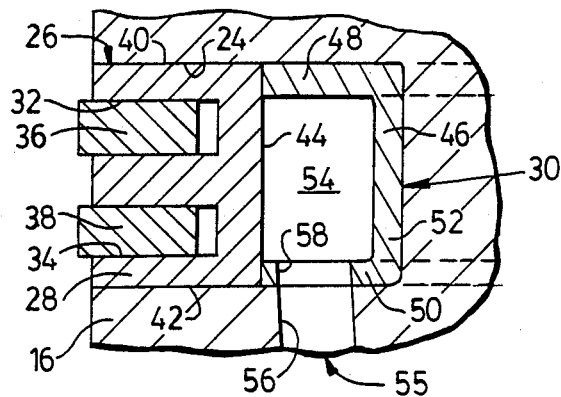
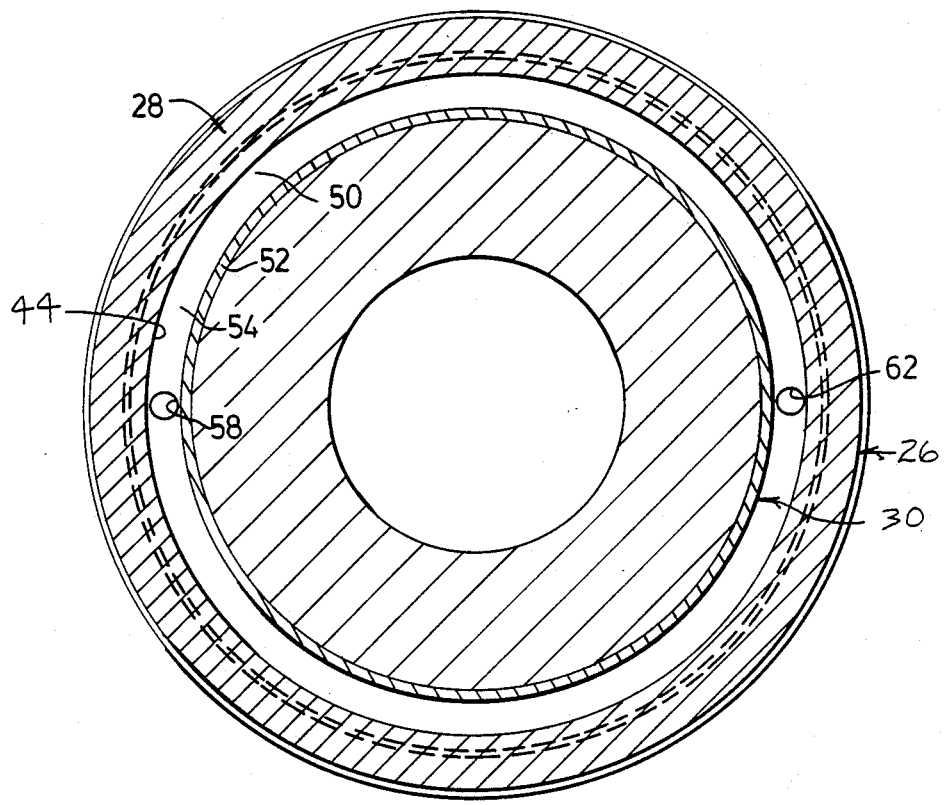

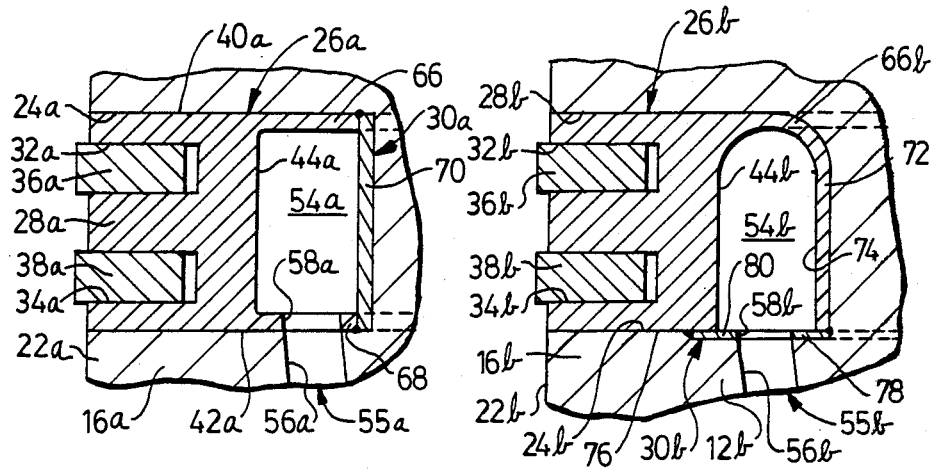
Fig. 4.
Fig. 5.
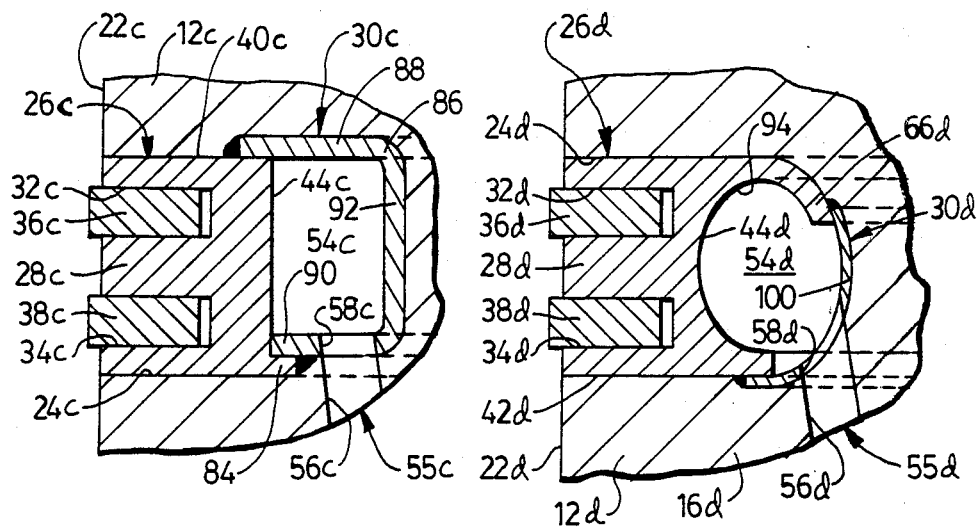
Fig. 6.
Fig. 7.

LIQUID COOLED PISTON RING CARRIER ASSEMBLY AND PISTON USING SAME

TECHNICAL FIELD

This invention relates to a liquid-cooled piston for reciprocal movement within a cylinder of an internal combustion engine and having an integral coolant channel through which a temperature controlling liquid circulates for effective temperature regulation of the piston.

BACKGROUND ART

The crown region of a piston in an internal combustion engine is heated by the burning fuel air mixture. The piston, together with the piston rings, must effectively seal the combustion chamber against the passage of hot combustion gases and lubricating oil under all operating conditions. The trend to increase the specific output of internal combustion engines has resulted in the mechanical and thermal requirements of the engine pistons to also increase. The temperature of the piston in the area of the crown and ring grooves must remain within prescribed limits. At elevated temperatures the lubricating oil may gum the region of the ring grooves causing sticking of the rings, thus increasing blow-by, burnt rings, and possible seizure of the piston in the cylinder. Thermal cracks in the piston can also result if a maximum temperature is exceeded.

The most simple form of piston cooling is to spray the under crown of the piston with liquid coolant such as engine oil, however, for use in heavy duty internal combustion engines this method is not satisfactory since it will not dissipate sufficient heat.

A considerably more effective regulation of piston temperature is achieved by means of forced oil cooling of the piston. This method provides internal galleries or channels within the piston body in the area of the crown and ring and. Oil is force fed into the channel whereupon the oil will be shaken about in the channel by the piston motion. This turbulent "cocktail shaker" action results in the oil absorbing heat from the interior surface of the channel. Normally a jet arrangement directs cooling oil into the channel by way of a passage in the piston body connecting to the cooling channel. Likewise, oil exits the channel through a passage in the piston.

U.S. Pat. No. 4,651,631 issued to Jean-Claude Avezou on Mar. 24, 1987, U.S. Pat. No. 4,083,292 issued to Alex Goloff on Apr. 11, 1978 and U.S. Pat. No. 4,408,575 issued to Clairmont, Jr. et al. on Oct. 11, 1983 disclose piston designs where the cooling galleries are formed by the assembly of and the securing together of component parts. Such arrangements can be complicated and expensive to manufacture.

Normally in cast aluminum pistons the cooling channels are manufactured by casting in special shaped removable cores of various materials such as water soluble salt mixtures or graphite foam which can be burnt out. In some other arrangements the channels are formed out of sheet steel or cast-in pipe systems which remain in the piston. A problem with these types of arrangements is that the location of the gallery may not be the most desirable for maximum cooling because of structural considerations imposed on the piston by cyclic combustion gas loading and thermal growth. The void created by the channel may undesirably limit the fatigue strength of the piston or be responsible for initiating fatigue cracks. The providing, the placement, and the removal of cores to form the galleries add significantly to the cost to manufacture the piston. A mislocated core during the casting process can affect the balance of the piston and ultimately its performance.

It is the object of the present invention to provide a ring carrier assembly for a piston that defines a cooling channel through which liquid coolant circulates. With the cooling channel being integral with the ring carrier assembly improved cooling of the piston ring and crown areas is realized. Also with the cooling gallery being integral with the ring carrier assembly the structural integrity of the piston is maintained.

The present invention is directed to overcome one or more of the problems as set forth above.

DISCLOSURE OF THE INVENTION

In one aspect of the present invention, a ring carrier assembly is disposed in an annular groove defined in the outer peripheral surface of the piston body. The ring carrier assembly has at least one peripheral groove adapted to receive a sealing ring and defines an integral coolant channel. The ring carrier assembly further includes inlet and outlet ports so that a coolant can circulate through the cooling channel.

BRIEF DESCRIPTION OF THE DRAWINGS

FIG. 1 is a longitudinal cross-sectional view of a piston including a ring carrier assembly of the present invention;

FIG. 2 is an enlarged cross-sectional view of the ring carrier assembly of FIG. 1;

FIG. 3 is a cross-sectional view taken in the direction of arrows III—III in FIG. 1;

FIG. 4 is an enlarged cross-sectional view of an alternate embodiment of the ring carrier assembly;

FIG. 5 is an enlarged cross-sectional view of an alternate embodiment of the ring carrier assembly;

FIG. 6 is an enlarged cross-sectional view of an alternate embodiment of the ring carrier assembly; and FIG. 7 is an enlarged cross-sectional view of an alternate embodiment of the ring carrier assembly.

BEST MODE FOR CARRYING OUT THE INVENTION

Referring to FIGS. 1, 2 and 3 a liquid-cooled, aluminum alloy, cast piston 10 is shown of the type used for reciprocal movement within a cylinder of an internal combustion engine. The piston 10 includes a generally cylindrical piston body generally designated 12 and includes a crown portion 14 and a dependent hollow cylindrical skirt portion 16, the latter defining a cavity 18 for reception of a piston rod and a wrist pin not shown. The skirt portion 16 defines a bore 20 for reception of such a wrist pin. The piston body 12 has an outer peripheral surface 22 with an outwardly facing annular groove 24 defined in the outer peripheral surface. A generally annular ring carrier assembly 26 having a generally annular metallic body 28 and enclosure means 30 is disposed in the annular groove 24. The groove 24 is formed by the casting of the piston body 12 around the ring carrier assembly 26 which mechanically secures the ring carrier assembly in the piston body 12.

The metallic body 28 of the ring carrier assembly 26 has longitudinally spaced upper and lower machined peripheral grooves 32 and 34, each of which is adapted to receive a sealing ring 36 and 38 respectively. Depending upon the piston design more or less of the annular grooves may be required. The metallic body 28 further includes upper and lower surfaces 40 and 42 and an axially extending inner peripheral surface or wall 44. The metallic body 28 in this specific instance is of a simple rectangular shape, although other specific cross-sectional configurations could be used as desired.

The enclosure means 30 includes a thin-walled, annular, generally "C" shaped, metallic, closure member 46 having annular upper and lower radial walls 48 and 50 and an axial peripheral wall 52 joining the upper and lower walls. The upper and lower walls 48 and 50 are secured to the wall 44 of the metallic body 28, such as by welding, brazing or the like. The metallic body 28 and the closure member 46 collectively define a substantially closed, generally annular, integral coolant channel 54 spaced generally radially inwardly of the peripheral grooves 32 and 34 and through which a temperature controlling fluid circulates.

Means 55 for providing communication with the coolant channel 54 so that, in use, a coolant stream can be directed to the channel includes a generally longitudinally extending coolant inlet passage 56 defined in the skirt portion 16 of the piston 10 and an aligned port 58 defined in the lower wall 50 of the closure member 46. During engine operation, liquid coolant, in the form of pressurized engine lubrication oil, is directed from a stationary nozzle 60 which sprays the oil upwardly through the passage 56 and port 58 into the annular channel 54. As best shown in FIG. 3, approximately 180° about the piston 10 from where the coolant inlet passage 56 intersects the port 58, is an outlet port 62 in the lower wall 50 of the closure member 46 which communicates with a generally longitudinally extending coolant outlet passage 64 in the skirt 16. The coolant outlet passage 64 conveys the oil downwardly away from the coolant channel 54 and towards an oil supply sump, not shown. The coolant channel 54 in one preferred embodiment is completely closed except for the inlet and outlet ports 58 and 62 which communicate with passages 56 and 64.

Referring now to FIG. 4, an alternate embodiment of the subject ring carrier assembly 26 is disclosed. In this embodiment a generally annular ring carrier assembly 26a having a generally annular metallic body 28a and a generally annular enclosure means 30a is disposed in an outwardly facing groove 24a defined in an outer peripheral surface 22a of a piston body 12a. The groove 24a is formed by the casting of the piston body 12a around the ring carrier assembly 26a which mechanically secures the ring carrier assembly in the piston body 12a.

The metallic body 28a has longitudinally spaced upper and lower peripheral grooves 32a and 34a individually adapted to receive a sealing ring 36a and 38a respectively. The metallic body 28a further includes upper and lower surfaces 40a and 42a and an axially extending inner peripheral wall 44a. A pair of relatively thin upper and lower annular walls 66 and 68 extend radially inward from wall 44a to form an inwardly facing, generally "C" shaped cross-sectional shape.

The enclosure means 30a includes a relatively thin-walled, metallic, closure ring 70 secured, such as by welding, brazing or the like to the upper and lower walls 66 and 68. The metallic body 28a and the ring 70 collectively define a substantially closed, generally annular, integral coolant channel 54a spaced generally radially inwardly of the peripheral grooves 32a and 34a and through which a temperature controlling fluid circulates.

Means 55a for providing communication with the coolant channel 54a, so that, in use, a coolant can be directed to the channel, includes a generally longitudinally extending inlet passage 56a defined in a skirt portion 16a of the piston body 12a and an aligned port 58a defined in the lower wall 68. Approximately 180° about the piston from where the passage 56a intersects the port 58a is an outlet port (not shown) in the lower wall 68 which communicates with a coolant outlet passage (not shown). The outlet port and outlet passage are arranged in a manner similar to that disclosed in FIG. 1 and 3.

Referring now to FIG. 5, a further alternate embodiment of the subject ring carrier assembly 26 is disclosed. In this embodiment a generally annular ring carrier assembly 26b having a generally annular metallic body 28 b and a generally annular enclosure means 30b is disposed in an outwardly facing groove 24b defined in an outer peripheral surface 22b of a piston body 12b. The groove 24b is formed by the casting of the piston body 12b around ring carrier assembly 26b which mechanically secures the ring carrier assembly in the piston body 12b.

The metallic body 28b has longitudinally spaced upper and lower peripheral grooves 32b and 34b individually adapted to receive a sealing ring 36b and 38b respectively. The metallic body 28b further includes an axially extending inner peripheral wall 44b, an upper, relatively thin, curved annular wall 66b extending radially inward from the inner peripheral wall and a second relatively thin inner peripheral wall 72 extending downward from the upper annular wall 66b. The walls 44b, 66b and 72 define a downwardly facing, open-ended, generally "C" shaped, annular cavity 74. The cavity 74 opens on the lower portion of the metallic body 28b to define radial inner and outer annular bottom surfaces 76 and 78, with the cavity spaced generally radially inwardly of the peripheral grooves 32b and 34b.

The enclosure means 30b includes a flat, thin, washer shaped, metallic, closure member or wall 80 secured, such as by welding, brazing or the like to surfaces 74 and 76 closing the open-ended cavity 74. The metallic body 28b and the wall 80 collectively define a substantially closed, generally annular, integral coolant channel 54b thru which a temperature controlling fluid circulates.

Means 55b for providing communication with the coolant channel 54b, so that, in use, a coolant can be directed to the channel, includes a generally longitudinally extending coolant inlet passage 56b defined in a skirt portion 16b of the piston body 12b and an aligned port 58b defined in the wall 78. Approximately 180° about the piston from where the passage 56b intersects the port 58b is an outlet port (not shown) in the wall 78 which communicates with a coolant outlet passage (not shown). The coolant outlet port and outlet passage are arranged in a manner similar to that disclosed in FIG. 1 and 3.

Referring now to FIG. 6, another alternate embodiment of the subject ring carrier assembly 26 is disclosed. In this embodiment a generally annular ring carrier assembly 26c having a generally annular metallic body 28c and a generally annular enclosure means 30c is disposed in an outwardly facing groove 24c defined in an outer peripheral surface 22c of a piston body 12c. The groove 24c is formed by the casting of the piston body 12c around the ring carrier assembly 26c which mechanically secures the ring carrier assembly in the piston body 12c.

The metallic body 28c has longitudinally spaced upper and lower peripheral grooves 32c and 34c individually adapted to receive a sealing ring 36c and 38c respectively. The metallic body 28c further includes an upper surface 40c and an axially extending inner peripheral wall 44c. A relatively short, lower annular ledge 84 extends radially inward from the inner peripheral wall 44c.

The enclosure means 30c includes a thin-walled, annular, outwardly facing, generally "C" shaped, metallic, closure element 86 having annular upper and lower radial walls 88 and 90 and an axial inner peripheral wall 92 joining the upper and lower radial walls. The upper wall 88 overlaps and rest on the upper surface 40c of the metallic body 28c with the lower wall 90 overlapping and resting on the ledge 84 whereupon the walls are secured, such as by welding, brazing or the like to the upper surface 40c and the ledge 84. The metallic body 28c and the closure element 86 collectively defining a substantially closed, generally annular, integral coolant channel 54c spaced generally radially inwardly of the peripheral grooves 32c and 34c and through which a temperature controlling fluid circulates.

Means 55c for providing communication with the coolant channel 54c, so that, in use, a coolant can be directed to the channel, includes a generally longitudinally extending inlet passage 56c defined in a skirt portion 16c of the piston body 12c and an aligned port 58c defined in the lower wall 90. Approximately 180° about the piston from where the passage 56c intersects the port 58c is an outlet port (not shown) in the lower wall 90 which communicates with a coolant outlet passage (not shown). The outlet port and outlet passage are arranged in a manner similar to that disclosed in FIG. 1 and 3.

Referring now to FIG. 7, yet another alternate embodiment of the subject ring carrier assembly 26 is disclosed. In this embodiment a generally annular ring carrier assembly 26d having a generally annular metallic body 28d and a generally annular enclosure means 30d is disposed in an outwardly facing groove 24d defined in an outer peripheral surface 22d of a piston body 12d. The groove 24d is formed by the casting of the piston body 12d around the ring carrier assembly 26d which mechanically secures the ring carrier assembly in the piston body.

The metallic body 28d has longitudinally spaced upper and lower peripheral grooves 32d and 34d individually adapted to receive a sealing ring 36d and 38d respectively. The metallic body 28d further includes a lower surface 42d an axially extending, curved, inner peripheral wall 44d and an upper, relatively thin, annular, curved wall 66d that extends generally radially inward from the inner peripheral wall 44d. The curved peripheral wall 44d and the upper curved wall 66d define an inwardly facing, generally "C" shaped, annular pocket 94 that opens on the lower inner portion of the annular metallic body 28d with the pocket spaced generally radially inwardly of the peripheral grooves 32d and 34d.

The enclosure means 30d includes a relatively thin, annular, arcuate, metallic, closure plate or wall 100. The wall 100 is secured, such as by welding, brazing or the like to the upper annular wall 66d and to the lower surface surfaces 42d closing the pocket 94. The metallic body 28d and the wall 100 collectively defines a substantially closed, generally annular, integral coolant channel 54d space generally radially inwardly of the peripheral grooves 32d and 34d and through which a temperature controlling fluid circulates.

Means 55d for providing communication with the coolant channel 54d, so that, in use, a coolant can be directed to the channel includes a generally longitudinally extending inlet passage 56d defined in a skirt portion 16d of the piston body 12d and an aligned port 58d defined in the plate 100. Approximately 180° about the piston from where the passage 56d intersects the port 58d is an outlet port (not shown) in the plate 100 which communicates with a coolant outlet passage (not shown). The outlet port and outlet passage are arranged in a manner similar to that disclosed in FIG. 1 and 3.

In all the previously described embodiments further cooling of the piston is provided by the spraying of the under crown of the piston with coolant in a conventional manner.

Industrial Applicability

The liquid-cooled, aluminum alloy, cast piston of the present invention is particularly adaptable to heavy duty engine applications with increased specific output.

The ring carrier assemblies 26, 26a, 26b, 26c and 26d in each of the illustrated embodiments advantageously have strategically located, generally annular, integral, coolant channels 54, 54a, 54b, 54c, and 54d spaced generally adjacent and radially inwardly of the peripheral grooves 32, 32a, 32b, 32c and 32d and 34, 34a, 34b, 34c and 34d. Because of the specific location of the coolant channel 54, 54a, 54b, 54c and 54d coolant can be effectively circulated adjacent the piston ring and crown areas that require the most cooling. Significantly, the single step of casting the piston body 12, 12a 12b, 12c, and 12d around the ring carrier assembly 26, 26a, 26b, 26c, and 26d eliminates any additional processing to form a coolant channel within the piston body. Also, with the coolant channels 54, 54a, 54b, 54c, and 54d being integral with the ring carrier assemblies 26, 26a, 26b, 26c and 26d the structural integrity of the piston is not sacrificed by having separate galleries or channels formed by removable cores or the like.

From the foregoing, it will be apparent that the subject invention provides a means for providing improved cooling of a piston for an engine. The ring carrier assemblies as set forth above have integral cooling channels for improved, effective regulation of piston temperature in the area of the crown and ring band area. The embodiments eliminate the casting in of special removable cores or other special arrangements to form the channels that add to manufacturing cost, can be mislocated and may not be in the most desirable location for maximum cooling because of structural considerations. Furthermore the embodiments provide arrangements that are simple in construction and utilize simple manufacturing techniques.

Other aspects, objects, and advantages can be obtained from a study of the drawings, the disclosure and the appended claims.

What is claimed:

1. A liquid-cooled piston for reciprocal movement within a cylinder of an internal combustion engine comprising;

a generally cylindrical piston body having an outer peripheral surface with an annular groove defined in the outer peripheral surface;

a ring carrier assembly disposed in the annular groove and having at least one peripheral groove adapted to receive a sealing ring, the ring carrier assembly includes an annular metallic body having an axially extending inner peripheral wall and a pair of upper and lower annular walls extend radially inwardly from the peripheral wall to form an inwardly facing, generally "C" shaped cross-sectional shape and enclosure means collectively defining a substantially closed, generally annular, integral coolant channel; and means for providing communication with the coolant channel so that in use a coolant stream can be directed to the coolant channel.

2. The liquid-cooled piston of claim 1 wherein the annular groove is formed by the casting of the piston body around the ring carrier assembly.

3. The liquid-cooled piston of claim 1 wherein the coolant channel is spaced radially inward of the peripheral groove in the metallic body.

4. The liquid-cooled piston of claim 1 wherein the enclosure means includes a relatively thin-walled closure ring secured to the upper and lower walls of the annular metallic body.

5. The liquid-cooled piston of claim 4 wherein the piston body includes a dependent hollow skirt portion and the means for providing communication with the coolant channel includes a generally longitudinally extending coolant inlet passage defined in the skirt portion and an aligned port defined in the lower wall of the annular metallic body.

6. A liquid-cooled piston for reciprocal movement within a cylinder of an internal combustion engine comprising;

a generally cylindrical piston body having an outer peripheral surface with an annular groove defined in the outer peripheral surface;

a ring carrier assembly disposed in the annular groove and having at least one peripheral groove adapted to receive a sealing ring, the ring carrier assembly includes an annular metallic body and enclosure means collectively defining a substantially closed, generally annular, integral coolant channel, the annular metallic body includes an upper surface, an axially extending inner peripheral wall and a relatively short, lower, annular ledge extending radially inward from the inner peripheral wall, the enclosure means includes a thin-walled, annular, generally "C" shaped, outwardly facing radial closure element having annular upper and lower radial walls and an axial peripheral wall joining the upper and lower walls with the upper wall of the closure element overlapping and resting on the upper surface of the metallic body and the lower wall overlapping and resting on the ledge of the metallic body with the upper and lower walls of the closure element being secured to the annular metallic body; and means for providing communication with the coolant channel so that in use a coolant stream can be directed to the coolant channel.

7. The liquid-cooled piston of claim 6 wherein the piston body includes a dependent hollow skirt portion and the means for providing communication with the coolant channel includes a generally longitudinally extending coolant inlet passage defined in the skirt portion and an aligned port defined in the lower radial wall of the closure element.

8. The liquid-cooled piston of claim 6 wherein the annular groove is formed by casting of the piston body around the ring carrier assembly.

9. The liquid-cooled piston of claim 6 wherein the coolant channel is spaced radially inward of the peripheral groove in the metallic body.

* * * * *